United States Patent Office 3,632,604
Patented Jan. 4, 1972

1

3,632,604
2-SUBSTITUTED-4-PHENYL AND SUBSTITUTED
PHENYL-1-PYRROLINES
Marcel K. Eberle, Madison, and William J. Houlihan, Mountain Lakes, N.J., assignors to Sandoz-Wander, Inc., Hanover, N.J.
No Drawing. Filed Apr. 9, 1970, Ser. No. 27,145
Int. Cl. C07d 27/14
U.S. Cl. 260—326.9                      8 Claims

ABSTRACT OF THE DISCLOSURE 2-substituted-4-phenyl and substituted phenyl-1-pyrrolines, e.g., 4-(p-chlorophenyl)-2-(3-dimethylaminopropylamino)-1-pyrroline dihydrochloride are prepared by treating a 2-alkoxy-4-phenyl or substituted phenyl-1-pyrroline with a substituted diamine. The compounds are useful as tranquilizers.

---

This invention relates to substituted pyrrolines. More particularly it relates to 2-substituted-4-phenyl and substituted phenyl-1-pyrrolines, acid addition salts thereof, and to processes for their preparation.

The compounds of this invention may be represented by the following structural formula (Ia)

where
$R_1$ and $R_2$ are both hydrogen or both lower alkyl having 1 to 4 carbon atoms, e.g., methyl, ethyl, propyl, isopropyl, butyl, or isobutyl or $NR_1R_2$ together are $$-N\hspace{-2pt}\diagdown\hspace{-6pt}\diagup Z$$

where Z is O, $NR_6$ or $(CH_2)_y$
where
$R_6$ is hydrogen, or lower alkyl having 1 to 4 carbon atoms, e.g., methyl, ethyl, propyl, isopropyl, butyl or isobutyl, and $y$ is 0, 1, 2 or 3;
$R_3$ and $R_4$ are independently hydrogen, or lower alkyl having 1 to 4 carbon atoms, e.g., methyl, ethyl, propyl, isopropyl, butyl, or isobutyl,
$R_5$ is lower alkyl having 1 to 4 carbon atoms, e.g., methyl, ethyl, propyl, isopropyl, butyl or isobutyl, lower alkoxy having 1 to 4 carbon atoms, e.g., methoxy, ethoxy, propoxy, isopropoxy, butoxy or isobutoxy, halo having an atomic weight of 19 to 36, trifluoromethyl, or where $m=2$, methylenedioxy,
$n$ is 0, 1, or 2, and
$m$ is 0, 1 or 2,
provided that (1) when $R_1$ and $R_2$ are hydrogen, $R_3$ and $R_4$ must be identical substituents, and
(2) there are no adjacent trifluoromethyl groups.

The compounds of Formula Ia may also be illustrated by their tautomeric equivalent such as represented by the following structural formula:

2

(Ib)

In order to simplify this description, however, Formula Ia only will be used. It should be nevertheless understood that the compounds of Formula Ib may be represented by Formula Ia and the two tautomeric forms are within the concept of the present invention.

The compounds of Formula Ia may be prepared according to the following reaction scheme:

(II)      (III)

(Ia)

where
$R_1$, $R_2$, $R_3$, $R_4$, $R_5$, $n$ and $m$ have the above stated significance, and $R_7$ is straight chain lower alkyl having 1 to 3 carbon atoms, e.g., methyl, ethyl or propyl.

The compounds of Formula Ia may be prepared by treating a compound of Formula II with a compound of Formula III preferably in the presence of an inert gas such as nitrogen, argon and the like. The reaction is preferably carried out in an inert solvent such as lower alkanol having 1 to 6 carbon atoms, e.g. methanol, ethanol, propanol, isopropanol, butanol, isobutanol, pentanol, isopentanol, hexanol, or isohexanol, at a temperature from about 50° C. to the reflux temperature of the solvent, preferably 60 to 120° C., for about 2 to 24 hours, preferably 10 to 20 hours. Neither the solvents used nor the temperatures are critical.

The compounds of Formula Ia may be prepared in acid addition salt form, such as the hydrochloride, by conventional methods, such as suspending the free base compound in alcohol or water and treating with the appropriate acid. When it is desired to convert such salts to the corresponding free bases, conventional techniques may be utilized, e.g., dissolution of the salt in water and precipitation using a base such as sodium hydroxide.

The compounds of Formula Ia may be recovered using conventional recovery techniques, such as crystallization.

Certain of the compounds of Formulas II and III are known and may be prepared according to methods disclosed in the literature. Those compounds of Formulas II and III not specifically disclosed are prepared according to analogous methods from known materials.

The compounds represented by Formula Ia are useful because they possess pharmaceutical properties in animals. In particular these compounds are useful as tranquilizers as indicated by their ability to antagonize amphetamine induced stimulation in mice, wherein the mice are each given 2.5 milligrams per kilogram of body weight of amphetamine sulfate and 25–200 milligrams per kilogram of the active agent. The locomotor activity of the mice is measured for an 80 minute period at 10 minute intervals with an actophotometer (manufactured by Woodard Res. Corp., Hernon, Va.). The compounds (Ia) may be administered orally or parenterally and, depending upon the compound employed and the mode of administration, the exact dosage utilized may vary.

Furthermore, these compounds (Ia) may be similarly administered in the form of their non-toxic pharmaceutically acceptabe acid addition salts. Such salts posses the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, p-toluenesulfonate, benzenesulfonate and the like. In general, satisfactory results are obtained when these compounds are administered for the hypotensive use at a daily dosage of about 2 milligrams to about 100 milligrams per kilogram of animal body weight. This daily dosage is preferably administered in divided doses 2 to 4 times a day, or in sustained release form. For most large mammals such as primates, the total daily dosage is from about 100 milligrams to about 2000 milligrams. Dosage forms suitable for internal use comprise from about 25 milligrams of about 1000 milligrams of the active compound in intimate admixture with a solid or liquid pharmaceutically acceptable carried or diluent.

A representative formulation suitable for oral administration is a capsule prepared by standard techniques which contains the following:

Ingredients: Parts by weight
4 - (p - chlorophenyl) - 2 - (3 - dimethylaminopropylamino)-1-pyrroline dihydrochloride ___ 50
Inert filler (e.g., starch, kaolin, lactose, etc.) __ 250

EXAMPLE I 2-(2-dimethylaminoethylamino)-4-phenyl-1-pyrroline dihydrochloride 3.6 grams of 2-ethoxy-4-phenyl-1-pyrroline and 2.0 g. of N,N-dimethylethylenediamine in 20 cc. of absolute ethanol were refluxed overnight under a nitrogen atmosphere. After cooling, the solution was saturated with hydrogen chloride gas and the product precipitated by the addition of ether. Recrystallization from ethanol-ether 1:1, gave the product 2-(2-dimethylaminoethylamino)-4-phenyl-1-pyrroline dihydrochloride, M.P. 229°–231° C.

EXAMPLE II

Following the procedure of Example I, and in place of 2-ethoxy-4-phenyl-1-pyrroline starting with, (1) 2-ethoxy-4-phenyl-1-pyrroline,
(2) 2-ethoxy-4-(p-chlorophenyl)-1-pyrroline,
(3) 2-ethoxy-4-(p-fluorophenyl)-1-pyrroline,
(4) 2-ethoxy-4-(p-tolyl)-1-pyrroline,
(5) 2-ethoxy-4-(p-methoxyphenyl)-1-pyrroline,
(6) 2-ethoxy-4-(p-trifluoromethylphenyl)-1-pyrroline
(7) 2-ethoxy-4-(3,4-dichlorophenyl)-1-pyrroline
(8) 2-ethoxy-4-(3,4-dimethylphenyl)-1-pyrroline
(9) 2-ethoxy-4-(3,4-dimethoxyphenyl)-1-pyrroline
(10) 2-ethoxy-4-(3,5-bistrifluoromethylphenyl)-1-pyrroline
(11) 2-methoxy-4-phenyl-1-pyrroline, or
(12) 2-ethoxy-4-(3,4-methylenedioxyphenyl)-1-pyrroline;

and in place of N,N-dimethylethylenediamine starting with, (1) dimethylaminopropylamine
(2) dimethylaminopropylamine
(3) 3-morpholinopropylamine
(4) 4-methyl-1-piperizinopropylamine
(5) pyrrolidinopropylamine
(6) piperidinopropylamine
(7) hexamethyleneiminopropylamine
(8) heptamethyleneiminopropylamine
(9) 2,3-diaminobutane
(10) 2,4-diaminopentane
(11) 2,5-diaminohexane, or
(12) dimethylaminopropylamine;

the following products are obtained, as the dihydrochloride salt, (1) 2-(3-dimethylaminopropylamino)-4- phenyl-1-pyrroline dihydrochloride, M.P. 167°–168° C.
(2) 2-(3-dimethylaminopropylamino)-4-(p-chlorophenyl)-1-pyrroline dihydrochloride, M.P. 210°–212° C.
(3) 2-(3-morpholinopropylamine)-4-(p-fluorophenyl)-1-pyrroline
(4) 2-(4-methyl-1-piperizinopropylamino)-4-(p-tolyl)-1-pyrroline
(5) 2-(pyrrolidinopropylamino)-4-(p-methoxyphenyl)-1-pyrroline
(6) 2-(piperidinopropylamino)-4-(p-trifluoromethylphenyl)-1-pyrroline
(7) 2-(hexamethyleneiminopropylamine)-4-(3,4-dichlorophenyl)-1-pyrroline
(8) 2-(heptamethyleneiminopropylamino)-4-(3,4-dimethylphenyl)-1-pyrroline
(9) 2(2-amino-1-methylpropylamino)-4-(3,4-dimethoxyphenyl)-1-pyrroline
(10) 2-(3-amino-1-methylbutylamino)-4-(3,5-bistrifluoromethylphenyl)-1-pyrroline
(11) 2-(4-amino-1-methylphentylamino)-4-phenyl-1-pyrroline
(12) 2-(3-dimethylaminopropylamino)-4-(3,4-methylenedioxyphenyl)-1-pyrroline.

What is claimed is:
1. A compound of the formula

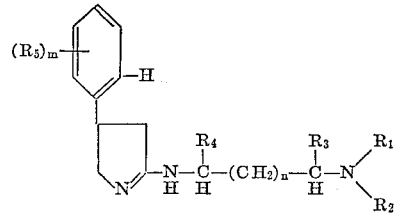

where
$R_1$ and $R_2$ are both hydrogen or both lower alkyl having 1 to 4 carbon atoms, or $NR_1R_2$ together are

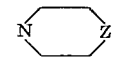

where Z is O, $NR_6$ or $(CH_2)_y$
where
$R_6$ is hydrogen, or lower alkyl having 1 to 4 carbon atoms, and $y$ is 0, 1, 2 or 3;
$R_3$ and $R_4$ are independently hydrogen, or lower alkyl having 1 to 4 carbon atoms,
$R_5$ is lower alkyl having 1 to 4 carbon atoms, lower alkoxy having 1 to 4 carbon atoms, halo having an atomic weight of 19 to 36, trifluoromethyl, or where $m=2$, methylenedioxy, $n$ is 0, 1 or 2, and $m$ is 0, 1 or 2, or a pharmaceutically acceptable acid addition salt thereof, provided that (1) when $R_1$ and $R_2$ are hydrogen, $R_3$ and $R_4$ must be identical substituents, and (2) there are no adjacent trifluoromethyl groups.

2. The compound of claim 1 which is 2-(2-dimethylaminoethylamino)-4-phenyl-1-pyrroline dihydrochloride.

3. The compound of claim 1 which is 2-(3-dimethylaminopropylamino) - 4 - phenyl-1-pyrroline dihydrochloride.

4. The compound of claim 1 which is 2-(3-dimethylaminopropylamino)-4-(p-chlorophenyl)-1-pyrroline dihydrochloride.

5. The compound of claim 1 which is 2-(2-dimethylaminoethylamino)-4-phenyl-1-pyrroline.

6. The compound of claim 1 which is 2-(3-dimethylaminopropylamino)-4-phenyl-1-pyrroline.

7. The compound of claim 1 which is 2-(3-dimethylaminopropylamino)-4-(p-chlorophenyl)-1-pyrroline.

8. The process for preparing a compound according to claim 1 in free base form which comprises treating a compound of the formula

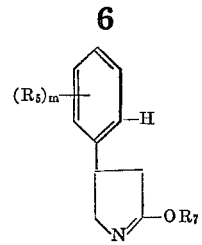

with a compound of the formula

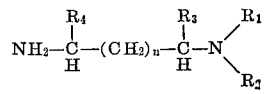

wherein $R_1$, $R_2$, $R_3$, $R_4$, $R_5$, $m$ and $n$ are as defined in claim 1.

References Cited

UNITED STATES PATENTS 3,378,438   4/1968   Gätzi _____ 260—326.9 X

ALEX MAZEL, Primary Examiner

J. A. NARCAVAGE, Assistant Examiner

U.S. Cl. X.R.

260—247.5 R, 268 H, 293 D, 326.5 D, 326.5 L;
424—248, 250, 267, 274